May 24, 1938.    W. J. MARSH ET AL    2,118,215
LUBRICANT OF HIGH FILM STRENGTH
Original Filed April 27, 1936
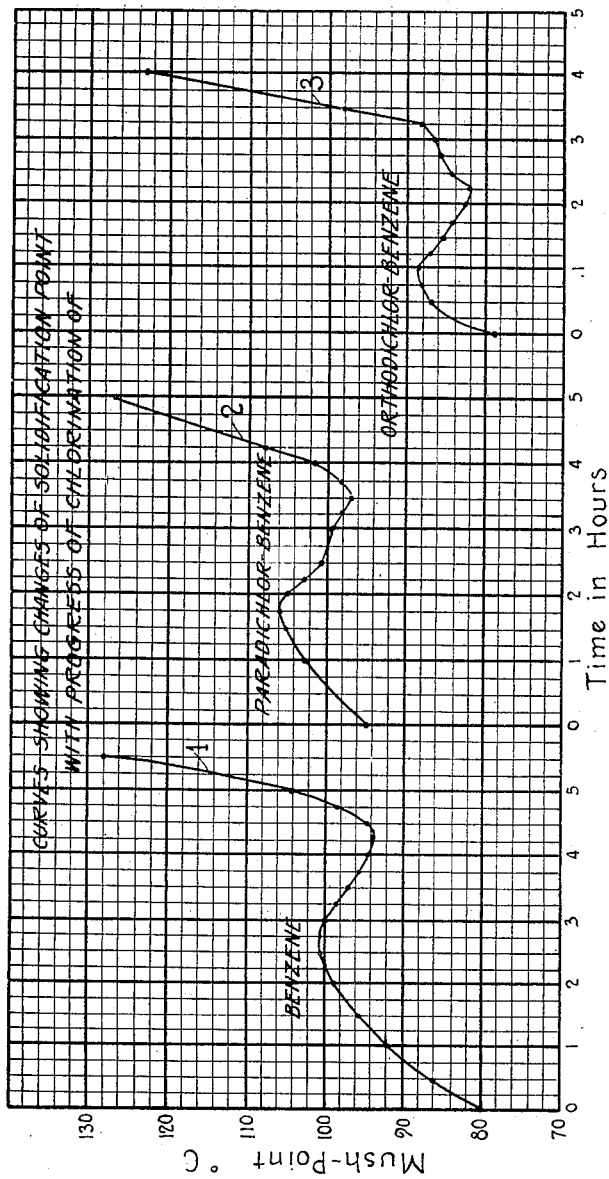
INVENTOR.
William J. Marsh
Joseph A. Spina
BY
Kenneth E. Stuart
ATTORNEY Patented May 24, 1938

2,118,215

UNITED STATES PATENT OFFICE 2,118,215

LUBRICANT OF HIGH FILM STRENGTH

William J. Marsh and Joseph A. Spina, Niagara Falls, N. Y., assignors to Hooker Electrochemical Company, New York, N. Y., a corporation of New York Original application April 27, 1936, Serial No. 76,661. Divided and this application March 18, 1937, Serial No. 131,700

10 Claims. (Cl. 87—9)

It is known that the halogens, and more particularly chlorine, in chemical combination with hydrocarbons, produce agents which, when added in various proportions to lubricating oils, have the property of increasing the film strength or load carrying capacity of the oils. Of the two principal classes of hydrocarbons which when combined with chlorine are available for this purpose, those of the aliphatic group are very effective at moderate temperatures, such as those met with in gear lubrication, while those of the aromatic or carbon ring group, on account of their greater stability against heat, are better suited to conditions such as those met with in automobile crank cases.

Among the chlorinated aromatic hydrocarbons hitherto most commonly used as film strengthening agents are chlor-naphthalenes and chlor-diphenyls. However, the supply of both these materials is limited, a circumstance which restricts their field of usefulness.

An aromatic hydrocarbon which is plentiful and cheap and which when chlorinated has good film strengthening properties is benzene. The chlorbenzenes have, however, not come into extensive use, for reasons that will hereinafter appear.

In the chlorination of benzene by substitution, the ultimate product is, of course, hexachlor benzene. At any intermediate stage the product consists of a mixture of molecules combined with a greater or less number of chlorine atoms and having them in different positions. Thus, there are three dichlor benzenes, i. e. 1—2 (ortho), 1—3 (meta) and 1—4 (para); three trichlor benzenes, i. e. 1—2—3, 1—2—4, and 1—3—5; and three tetrachlor benzenes, i. e. 1—2—3—4, 1—2—3—5 and 1—2—4—5. For various reasons (based partly upon the laws of chance and partly upon the tendency to symmetrical arrangement) certain of these predominate. Thus the 1—2—4 trichlor and 1—2—4—5 tetrachlor ordinarily predominate so greatly that they, for all practical purposes, determine the melting and boiling points of the usual isomeric mixtures of these products. Wherever in this specification technical trichlor and tetrachlor benzenes are mentioned it is to be understood that the usual mixtures of isomers consisting principally of the 1—2—4 and 1—2—4—5 respectively are intended.

Since the above mentioned isomers of partially chlorinated benzenes differ as to melting point, the product at any intermediate stage of the chlorination has no sharp solidification temperature. When cooled, crystals start to form. As these crystals separate out, the composition of the mother liquor changes, affecting the equilibrium and the formation of further crystals. The temperature at which crystals begin to form is, however, easily determined by dipping a thermometer in the liquid and noting the reading as the liquid begins to solidify. This temperature will be hereinafter referred to as the "solidification point".

As the chlorination proceeds, and hydrogen is replaced by chlorine the gravity of the mixture of course increases. If the chlorine is passed into the mixture at a uniform rate, the chlorine content at any given instant may be assumed to be proportional to the elapsed time from the start of chlorination. If a curve be constructed by plotting chlorine content or time of chlorination against solidification-point it will be found that this curve rises gradually to substantially above 100° C., then bends downward until it has dipped substantially below 100° C. and finally turn upward again quite sharply, and continues upward until it has reached 226° C., which is the melting point of hexachlor-benzene.

If a certain individual chlor-benzene is wanted, it can only be had by first producing a complex mixture of isomers of the various chlor-benzenes and separating out the desired product as by fractionation. This is not a simple matter, as the boiling points of some of the chlor-benzenes or their isomers are not widely separated. For this reason, particular individual chlor-benzenes are relatively expensive and some of them, such as the pentachlor, commercially unavailable. In fact, it has heretofore been generally believed that from the tetrachlor stage two chlorine molecules were generally picked up simultaneously with consequently very little production of pentachlor-benzene. Such knowledge as has heretofore been available regarding pentachlor-benzene has been derived from minor quantities separated by fractionation from relatively large quantities of tetrachlor and hexachlor-benzene.

Another bar that has heretofore operated to prevent the use of chlor-benzenes as film-strengthening agents in lubricants has been the volatility of the dichlors and trichlors and the low solubility in ordinary lubricants of the tetrachlor and hexachlor-benzenes. The solubility of these materials in lubricating oil is considered to be the percentage that remains in solution at 0° F. or that redissolves when the temperature is brought back to normal. This is known as the freeze test. The limit of solubility, as determined by the freeze test, of technical tetrachlor-benzene and hexachlor-benzene in mineral oil having a Saybolt viscosity of 230 seconds at 100° F. is about 2 percent, corresponding to chlorine contents in the lubricant of 1.31 percent and 1.5 percent respectively.

The chlor-benzenes heretofore proposed for use in lubricants have therefore been either too volatile or of too low a solubility in mineral oils to have any considerable practical importance. This cheap and plentiful hydrocarbon has thus been for many purposes unavailable as a chlorinatable material for use in lubricants. However, through our invention benzene having chlorine in chemical combination therewith now becomes available for use in lubricants for practically any purpose.

We have discovered and disclosed in a co-pending application, Serial No. 76,661, filed April 27, 1936, of which this present application is a division, that if the chlorination of benzol is stopped at the point at which the solidification-point, after having risen to a critical high point and fallen to a critical low point, begins again to rise, there results a mixture having about four times the solubility in oils of either tetrachlor or hexachlor-benzene.

The solidification point which is critical to our product depends upon whether any intermediate products are removed during chlorination. In the drawing, three cases are illustrated. In each case, solidification point has been plotted against time, on the assumption of a uniform rate of chlorine absorption. The rate of chlorination does not greatly affect the results and is purely arbitrary. It is approximately the same in the three cases, but not exactly so. As the initial and final stages of the chlorination have no particular significance, in so far as the present invention is concerned, only those stages which are pertinent are illustrated.

Curve 1 illustrates that portion of the chlorination of benzene, from which no intermediate products are removed, which is pertinent to our invention.

Curve 2 illustrates the corresponding stage in the chlorination of paradichlor-benzene produced as an intermediate product from the process of curve 1.

Curve 3 illustrates the corresponding stage in the chlorination of orthodichlor-benzene produced as an intermediate product from the process of curve 1.

Referring to curve 1: it will be seen that in the chlorination of benzene, from the point at which its solidification-point has already reached 80° C., the solidification-point rises along a smooth curve to about 101° C. At that point the curve forms a crest and turns downward. As the chlorination proceeds, the solidification-point continues to fall until it has reached about 94° C. There the curve turns again sharply upward. This is the point that is critical to our invention. If the chlorination be stopped at this point it will be found that the product has excellent stability and film strengthening properties and at the same time a solubility in mineral oils between three and four times as great as that of tetrachlor or hexachlor-benzene. In the figure, the chlorination has been carried beyond the critical point in order to show that there is no further anomaly which could result in any confusion. At or near the critical low solidification-point, however, a sample was taken off and fractionated. The results of this fractionation will be discussed later.

Referring to curve 2, this is plotted for the chlorination of paradichlor benzene which is assumed to have been removed by crystallization from the partially chlorinated benzene when the chlorine content thereof had reached a point corresponding to a large proportion of the dichlor. The particular method of separating paradichlor benzene from its mother liquor, consisting principally of orthodichlor-benzene, need not be discussed in detail, as it is a commercial process and does not form a part of the present invention. Both the paradichlor and orthodichlor benzenes are valuable intermediate products. Thus, orthodichlor-benzene is a useful solvent. It is therefore in some cases of advantage to produce a certain amount of it as a by-product of the process of our invention.

In curve 2 the critical solidification-points are generally higher than in curve 1. Thus the crest in curve 2 is reached at about 106° C. and the critical low-point at about 97° C. As before, and for the same reason, the curve is carried beyond the critical low-point. At this point, however, a sample was taken off and fractionated. the results being given below.

Curve 3 is plotted for the chlorination of the orthodichlor-benzene obtained from the mother liquor, from which the paradichlor-benzene has been removed by crystallization, as before stated. As paradichlor-benzene is a valuable insecticide, it is in some cases of advantage to produce a certain quantity of it as a by-product of our process. Moreover, by so doing a product of still lower solidification-point and greater solubility is secured. Thus in curve 3, the critical solidification points are lower than in either of the preceding curves. The crest is reached at about 88° C. and the low point at about 82° C. As before, a sample taken near the low solidification point was fractionated. The compositions of this and the other samples obtained in this way were as follows:

| Material chlorinated | Critical solidification points during chlorination | | Composition of product at critical low solidification point | | |
| --- | --- | --- | --- | --- | --- |
| | High | Low | Tetrachlor benzene | Pentachlor benzene | Hexachlor benzene |
| | °C. | °C. | Percent | Percent | Percent |
| Paradichlor-benzene | 106 | 97 | 54.7 | 34.4 | 10.9 |
| Benzene | 101 | 94 | 54.0 | 32.0 | 14.0 |
| Orthodichlor-benzene | 88 | 82 | 60.0 | 32.4 | 7.6 |

The difference in the results obtained when some of the intermediate products are removed during the chlorination is to be explained by the fact that the nature of the succeeding products is thereby affected.

The chlorination of benzene is carried out in two stages. This is necessitated by the fact that up to a certain point at which the product is largely tetrachlor-benzene, the material itself or the chlorinated products are highly volatile and the use of heat hazardous. After that point the use of heat may be necessary. The temperature in the final stage may be from 110° C. to 140° C. with a pressure of a few inches of water. In accordance with our process, chlorination is stopped when the solidification point of the product, after having risen above 100° C. and fallen, is seen to start upward again. The product is then neutralized by blowing with air, by treatment with sodium carbonate or both.

The solubilities in the mineral oil above mentioned, of the three products obtained as above described, together with their chlorine content, is given in the following table:

| Material chlorinated | Solidification point of product | Chlorine content of product | Solubility in mineral oil (Penna. 230/100° F. viscosity) | Chlorine content of corresponding lubricant |
|---|---|---|---|---|
| | ° C. | Percent | Percent | Percent |
| Paradichlor-benzene | 97 | 68.4 | 7 | 4.79 |
| Benzene | 94 | 68.6 | 7+ | 4.80 |
| Orthodichlor-benzene | 82 | 68.0 | 9 | 6.10 |

From this table it will be observed that the product made from paradichlor benzene has a slightly higher solidification-point and lower solubility than the product made from benzene, and that the product made from orthodichlor benzene has a lower solidification point and higher solubility than either of the others.

Instead of working from orthodichlor benzene, obviously our product can be made from the mother liquor from which paradichlor benzene has been removed. This is largely, but not wholly, orthodichlor benzene. The product made from such mother liquor has a solidification point and solubility intermediate between those of the products made from benzene and pure orthodichlor benzene respectively.

It will therefore be seen that, as a result of our discovery of the high degree of solubility of these chlor-benzene mixtures in mineral oils, the percentage of chlorine that can be introduced into lubricants through the agency of benzene derivatives is increased from 1.5 percent to more than 6 percent. While this is not much more than can be introduced through the agency of other known hydrocarbons, such as naphthalene, anthracene, diphenyl, etc., the supply of such other hydrocarbons is insufficient to permit of their general use in lubricants. This fact was not at first realized but with increasing demand for these high film strength lubricants the inadequacy of the supply of these hydrocarbons has already begun to be felt.

The relatively high solubility of our low solidification-point mixtures of chlor-benzenes is of advantage even in cases where it is not necessary to go to the full limit of their solubility; for the greater the limit of solubility, the more readily minor quantities are taken into solution and the lower the temperature at which they will remain in solution. Low melting point also is an advantage; for if the oil can, without too great an expense, be heated to above the melting point of the addition agent, the latter will incorporate with it as readily as if both were liquid and miscible. Our low solidification-point mixtures can be very readily incorporated with the oil at 90 to 100° C., which temperatures are easily obtainable with ordinary steam, whereas in order to dissolve tetrachlor or hexachlor benzol in oils with a similar facility, the oil must be heated to 150° C., a temperature which is not readily obtainable in an oil refinery. Moreover, if crystals should be formed in oils containing our low solidification-point mixtures, due to over saturation or very low temperatures, they are so fine that they will not settle out and the material can still be pumped; whereas, under similar conditions chlorinated naphthalene forms long needles which settle out and cannot be pumped.

By our invention, therefore, we have increased the availability of these high film strength lubricants so that their use on an extensive scale is now practicable. Our invention is therefore of importance not only to the automobile industry but to all users of automobiles and other heavy duty machinery.

Although we prefer the product obtained by stopping the chlorination at or near the critical low solidification point, we do not wish to be strictly limited to this product. The product obtained by stopping the chlorination at any point between the critical high and low solidification-points has superior solubility. Similarly, the product obtained by stopping the chlorination at a point beyond the low solidification-point, but before the solidification-point has risen again as high as the critical high solidification-point, will be found to have superior solubility and useful properties.

We have now further discovered that our low solidification-point chlor-benzenes, which we shall hereinafter refer to as our "L. S. P. chlor-benzenes", are more effective in increasing the film strength of mineral lubricating oils than are their separate ingredients, not only when used to the limit of their respective solubilities, but also when used in like proportions. This will be illustrated by the following tests in the Timken oil testing machine:

| Oil | Lever load withstood | Lever load not withstood |
|---|---|---|
| Base oil (Pennsylvania S. A. E. 90) | 10 | 15 |
| Base oil plus 2½%# tetrachlor-benzene | 35 | 40 |
| Base oil plus 2½%# pentachlor-benzene | 40 | 45 |
| Base oil plus 2½%# hexachlor-benzene | 40 | 45 |
| Base oil plus 2½% L. S. P. chlor-benzene ˣ | 45 | 50 |
| Base oil plus 5% L. S. P. chlor-benzene | 60 | 65 |

\# Limit of solubility in the base oil used.
ˣ Melting point 94° C.

In the Timken machine the bearing is between a shaft and a flat block, giving line contact. The pressure or "load" is applied by hanging weights upon the end of a lever through which the weight is transferred to the bearing. The test is that the oil shall carry the load for ten minutes without seizure or scoring of the surfaces. After a successful test a brightly polished line of contact will be found. The width of this can be measured and the intensity of pressure thus determined; but for purposes of comparison this is not necessary.

These tests show that 2½% of tetrachlor-benzene increases the oil-film strength 3½ times; the same proportion of pentachlor-benzene or hexachlor-benzene 4 times; and a like proportion of our L. S. P. chlor-benzene 4½ times. This is an unexpected result, as our product contains 68.6% chlorine, as compared with 71.7% in the case of pentachlor-benzene and 74.6% in the case of hexachlor-benzene. These tests therefore show an unpredictable co-operation between the ingredients of mixtures of chlor-benzene oil-film strengthening agents.

When the proportion of our L. S. P. chlor-benzene is increased to 5%, which is beyond the limits of solubility of each of the separate ingredients, the load carried by the oil is still further increased. Thus our product shows a greater effectiveness than that of its separate ingredients both by reason of some inherent unpredictable property and also by reason of its greater solubility.

We claim as our invention:

1. A lubricant composition of high film strength, comprising a major proportion of a mineral lubricating oil and in stable solution therein a minor proportion of a film-strengthening agent such as is produced by passing chlorine into benzene under reacting conditions, while observing the solidification-point of the resulting product, until said solidification-point, after having risen to a critical high point, is observed to have fallen again substantially below said critical high point, thereupon discontinuing the admission of chlorine to said benzene and removing from the product the hydrogen chloride formed by the reaction.

2. A lubricant composition of high film strength, comprising a major proportion of a mineral lubricating oil and in stable solution therein a minor proportion of a film-strengthening agent such as is produced by passing chlorine into benzene under reacting conditions, while observing the solidification-point of the resulting product, until said solidification-point, after having risen to a critical high point and then fallen to a critical low point, is observed to start again to rise, thereupon discontinuing the admission of chlorine to said benzene and removing from the product the hydrogen chloride formed by the reaction.

3. A lubricant composition of high film strength, comprising a major proportion of a mineral lubricating oil and in stable solution therein a minor proportion of a film-strengthening agent such as is produced by passing chlorine into benzene under reacting conditions, while observing the solidification-point of the resulting product, until said solidification-point, after having risen to substantially 103° C. and then fallen to substantially 94.5° C., is observed to start again to rise, thereupon discontinuing the admission of chlorine to said benzene and removing from the product the hydrogen chloride formed by the reaction.

4. A lubricant composition of high film strength, comprising a major proportion of a mineral lubricating oil and in stable solution therein a minor proportion of a film-strengthening agent such as is produced by passing chlorine into benzene under reacting conditions until the chlorine content of the resulting product corresponds substantially to that of dichlor-benzene, thereupon discontinuing the admission of chlorine to said benzene, crystallizing out and removing the para-dichlor-benzene formed as one product of the reaction, passing more chlorine into the residual product under reacting conditions, while observing the solidification-point thereof, until said solidification-point, after having risen to a critical high point, is observed to have fallen again substantially below said critical high point, thereupon discontinuing the admission of chlorine to said residual product and removing from the product the hydrogen chloride formed by the reaction.

5. A lubricant composition of high film strength, comprising a major proportion of a mineral lubricating oil and in stable solution therein a minor proportion of a film-strengthening agent such as is produced by passing chlorine into benzene under reacting conditions until the chlorine content of the resulting product corresponds substantially to that of dichlor-benzene, thereupon discontinuing the admission of chlorine to said benzene, removing from said product the ortho-dichlor-benzene formed as one product of the reaction, passing more chlorine into said ortho-dichlor-benzene under reacting conditions, while observing the solidification-point thereof, until said solidification-point, after having risen to a critical high point, is observed to have fallen again substantially below said critical high point, thereupon discontinuing the admission of chlorine to said orthodichlor-benzene and removing from the product the hydrogen chloride formed by the reaction.

6. A lubricant composition of high film strength, comprising a major proportion of a mineral lubricating oil and in stable solution therein a minor proportion of a film-strengthening agent such as is produced by passing chlorine into benzene under reacting conditions until the chlorine content of the resulting product corresponds to substantially that of dichlor-benzene, thereupon discontinuing the admission of chlorine to said benzene, crystallizing out and removing from said product the paradichlor-benzene formed as one product of the reaction, passing more chlorine into said paradichlor-benzene under reacting conditions, while observing the solidification-point thereof, until said solidification-point, after having risen to a critical high point, is observed to have fallen again substantially below said critical high point, thereupon discontinuing the admission of chlorine to said paradichlor-benzene and removing from the product the hydrogen chloride formed by the reaction.

7. A lubricant composition of high film strength, comprising a major proportion of a mineral lubricating oil and in stable solution therein a minor proportion of a film-strengthening agent comprising a mixture of tetrachlor-benzene, pentachlor-benzene and hexachlor-benzene having a solidification-point of substantially 97° C. and a solubility in mineral lubricating oil of substantially 7 per cent.

8. A lubricant composition of high film strength, comprising a major proportion of a mineral lubricating oil and in stable solution therein a minor proportion of a film-strengthening agent comprising a mixture of tetrachlor-benzene, pentachlor-benzene and hexachlor-benzene having a solidification-point of substantially 94° C. and a solubility in mineral lubricating oil of substantially 7 per cent.

9. A lubricant composition of high film strength, comprising a major proportion of a mineral lubricating oil and in stable solution therein a minor proportion of a film-strengthening agent comprising a mixture of tetrachlor-benzene, pentachlor-benzene and hexachlor-benzene having a solidification-point of substantially 82° C. and a solubility in mineral lubricating oil of substantially 9 per cent.

10. A lubricant composition of high film-strength, comprising a major proportion of a mineral lubricating oil and a minor proportion, in excess of 2½%, of a mixture of chlor-benzenes above trichlor-benzene in solution therein.

WILLIAM J. MARSH.
JOSEPH A. SPINA.